US012769369B2

(12) United States Patent
Sun

(10) Patent No.: US 12,769,369 B2
(45) Date of Patent: Oct. 20, 2026

(54) DISPLAY PANEL

(71) Applicants: Wuhan Tianma Microelectronics Co., Ltd. Shanghai Branch, Shanghai (CN); Wuhan Tianma Microelectronics Co., Ltd., Wuhan (CN)

(72) Inventor: Zongyu Sun, Shanghai (CN)

(73) Assignees: Wuhan Tianma Microelectronics Co., Ltd. Shanghai Branch, Shanghai (CN); Wuhan Tianma Microelectronics Co., Ltd., Wuhan (CN)

( * ) Notice: Subject to any disclaimer, the term of this patent is extended or adjusted under 35 U.S.C. 154(b) by 137 days.

(21) Appl. No.: 18/961,363

(22) Filed: Nov. 26, 2024

(65) Prior Publication Data

US 2025/0085746 A1 Mar. 13, 2025

(30) Foreign Application Priority Data

May 30, 2024 (CN) ......................... 202410693065.2

(51) Int. Cl.
*G06F 1/16* (2006.01)

(52) U.S. Cl.
CPC .......... *G06F 1/1652* (2013.01); *G06F 1/1656* (2013.01)

(58) Field of Classification Search
CPC ..................................................... G06F 1/1652
See application file for complete search history.

(56) References Cited

U.S. PATENT DOCUMENTS

2023/0119209 A1* 4/2023 Choi ..................... G06F 1/1652 361/679.01
2025/0021132 A1* 1/2025 Kim ...................... G06F 1/1681

FOREIGN PATENT DOCUMENTS

CN 108877524 A 11/2018
CN 113096543 B 11/2022

* cited by examiner

*Primary Examiner* — Jerry Wu
(74) *Attorney, Agent, or Firm* — Wiersch Law Group

(57) ABSTRACT

A display panel and a display apparatus are provided. The display panel includes a display module and a bending support layer. The display module includes a first region, a bending region and a second region. The bending region is connected between the first region and the second region. The first region includes a display surface. The bending support layer is located in the bending region and part of the bending support layer extends to the first region and the second region. A partial region of the bending support layer includes at least two first holes, the bending support layer has a first cross-section perpendicular to the plane where the first region is located. In the first cross-section, the first hole extends along a direction from the first region towards the second region, and at least two first holes are arranged in a thickness direction of the bending support layer.

16 Claims, 6 Drawing Sheets

DISPLAY PANEL

CROSS-REFERENCE TO RELATED APPLICATIONS

The present application claims priority to Chinese Application No. 202410693065.2, filed on May 30, 2024, the content of which is incorporated herein by reference in its entirety.

TECHNICAL FIELD

The present disclosure relates to the field of display technologies, and particularly, to a display panel and a display apparatus.

BACKGROUND

With the development of display technologies, consumers have increasingly higher requirements for the screen-to-body ratio of electronic products. Increasing the screen-to-body ratio of electronic products such as mobile phones and tablets has become one of the key research focuses for major manufacturers. Currently, Chip-on-film (COF) technologies can achieve a narrow lower frame. Its solution involves bending the bending region of the flexible screen and placing the drive chip and some wires on the back of the bent screen body. However, at present, there is a problem of screen breakage in the bending region, which is caused by insufficient support or excessive support on the back of the bending region.

SUMMARY

In a first aspect, embodiments of the present disclosure provide a display panel. The display panel includes a display module and a bending support layer. The display module includes a first region, a bending region and a second region. The bending region is connected between the first region and the second region. The first region includes a display surface. The bending support layer is located in the bending region. At least part of the bending support layer extends to the first region and the second region. A partial region of the bending support layer includes at least two first holes. The bending support layer has a first cross-section perpendicular to a plane where the first region is located. In the first cross-section, the first hole extends along a direction from the first region towards the second region, and at least two first holes are arranged along a thickness direction of the bending support layer.

In a second aspect, embodiments of the present disclosure provide a display apparatus. The display apparatus includes a display panel. The display panel includes a display module and a bending support layer. The display module includes a first region, a bending region and a second region. The bending region is connected between the first region and the second region. The first region includes a display surface. The bending support layer is located in the bending region. At least part of the bending support layer extends to the first region and the second region. A partial region of the bending support layer includes at least two first holes. The bending support layer has a first cross-section perpendicular to a plane where the first region is located. In the first cross-section, the first hole extends along a direction from the first region towards the second region, and at least two first holes are arranged along a thickness direction of the bending support layer.

BRIEF DESCRIPTION OF DRAWINGS

In order to more clearly explain the embodiments of the present disclosure or the technical solution in the related art, the drawings to be used in the description of the embodiments or the related art will be briefly described below. The drawings in the following description are some embodiments of the present disclosure. For those skilled in the art, other drawings can further be obtained based on these drawings.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiment of the present disclosure and the attached claims are also intended to include plural forms thereof, unless noted otherwise.

Embodiments of the present disclosure provides a display panel, which includes a display module and a bending support layer. The bending support layer is mainly configured to support a bending region of the display module. In some embodiments of the present disclosure, an extension direction of a first hole in the bending support layer is set according to a bending direction of the bending region. The extension direction of the first hole in the bending support layer is configured to be consistent with the bending direction of the bending region, so that it is easy for the bending position of the bending support layer to compress in the bending direction, thereby ensuring effective support of the bending region by the bending support layer, and avoiding screen breakage due to excessive support. Further, in some embodiments, a buffering structure is connected at least at one end of the bending support layer to increase the buffering performance of the bending support layer in a bending stress direction, thereby preventing stress from being concentrated at the bending vertex due to its inability to release, which can otherwise lead to excessive support to the bending region. In addition, in some embodiments of the present disclosure, a second hole is provided in at least one end of the bending support layer. By disposing an extension direction of the second hole, the bending support layer is easy to compress in a non-bending direction after bending, thereby further avoiding excessive support to the bending region. The above is an overview of the technical concept of the present disclosure, and the present disclosure will be described with embodiments below.

Figure 1:
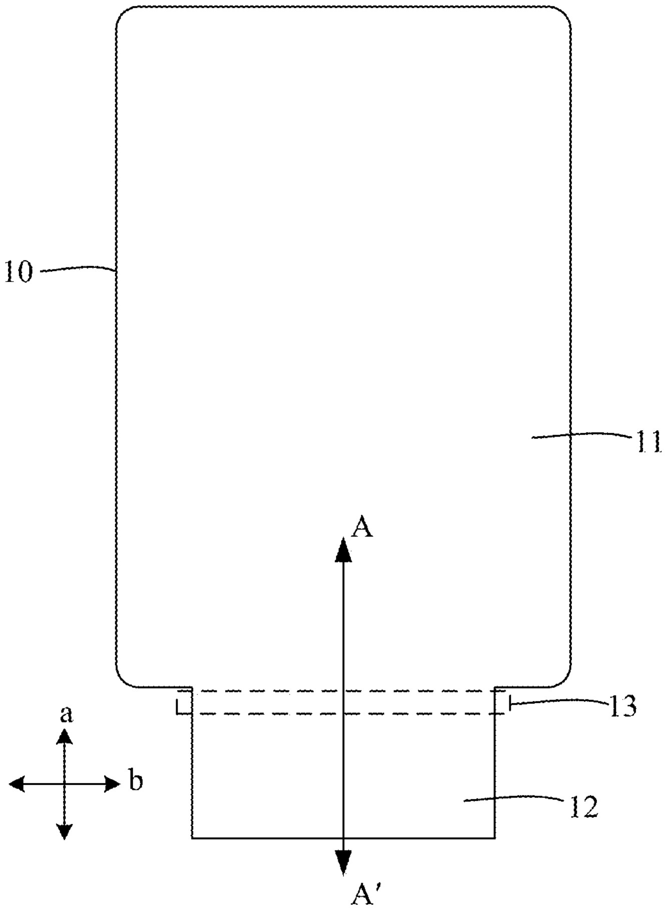
FIG. 1 is a schematic diagram of a display panel according to some embodiments of the present disclosure.
Figure 2:
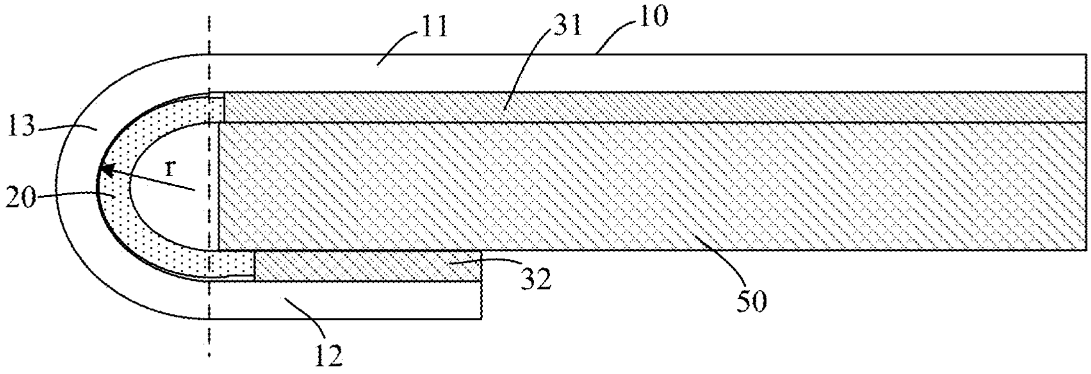
FIG. 2 is a schematic diagram of the display panel shown in FIG. 1 in a bent state according to some embodiments of the present disclosure.
Figure 3:
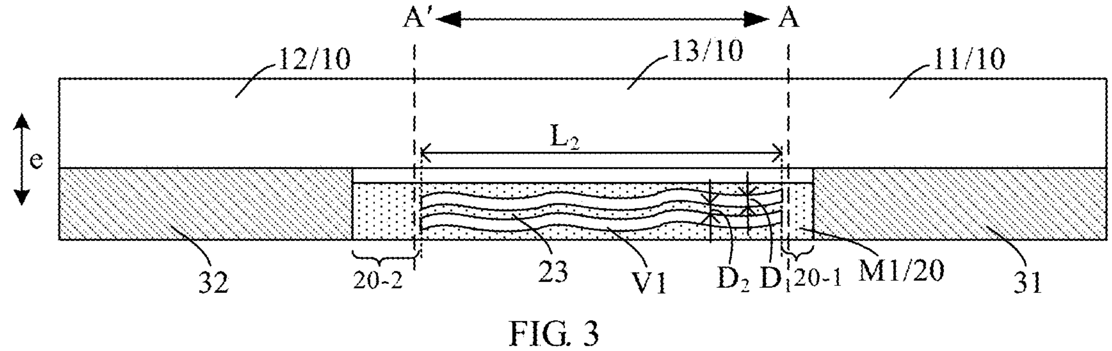
FIG. 3 is a cross-sectional view at a tangent A-A' position shown in FIG. 1 according to some embodiments of the present disclosure.

FIG. 1 illustrates a schematic diagram of a display panel according to some embodiments of the present disclosure, and FIG. 2 illustrates the display panel shown in FIG. 1 in a bent state. FIG. 3 illustrates a cross-sectional view at the tangent line A-A' position shown in FIG. 1.

Combining FIG. 1 and FIG. 2, the display panel includes a display module 10, a bending support layer 20, a first support layer 31 and a second support layer 32. The display module 10 is a structure for realizing the display function. In some embodiments of the present disclosure, the display module 10 includes multiple light-emitting elements and a driving layer. The light-emitting elements can be organic or inorganic. As shown in FIG. 2, the display module 10 is shown in a simplified manner. The display module 10 includes a first region 11, a bending region 13, and a second region 12. The bending region 13 is connected between the first region 11 and the second region 12. The first region 11 includes a display surface for displaying an image. The bending support layer 20 is located in the bending region 13 and extends at least partially to the first region 11 and the second region 12. The first support layer 31 is located on a side of the first region 11 away from the display surface. When the bending region 13 is in a bent state, the second support layer 32 is located on a side of the second region 12 adjacent to the first support layer 31. The first support layer 31 and the second support layer 32 are configured to support the first region 11 and the second region 12, respectively. Both the first support layer 31 and the second support layer 32 can be made of the same materials, such as polyimide or polyethylene terephthalate. As shown in FIG. 2, in a bent state, at least part of the surface of the bending support layer 20 is in contact with the display module 10. In some embodiments of the present disclosure, the bending support layer 20 can be made of a same material as the first support layer 31 and the second support layer 32.

FIG. 3 illustrates a cross-sectional view of the display panel when the display module 10 is in an unfolded state. As shown in FIG. 3, the cross-section of the bending support layer 20 is referred to as the first cross-section M1, which is perpendicular to the plane where the first region 11 is located (i.e., perpendicular to the direction of the display panel in FIG. 3). As shown in FIG. 3, part of the bending support layer 20 includes at least two first holes V1; in the first cross-section M1 of the bending support layer 20, the first hole V1 extends along the direction from the first region 11 toward the second region 12, and at least two first holes V1 are arranged along the thickness direction of the bending support layer 20 (i.e., the direction e indicated in FIG. 3). For a single first hole V1, at least part of it is located in the bending region 13.

Combining with FIG. 2, when the bending region 13 of the display module 10 is in a bent state, the direction from the first region 11 toward the second region 12 in the bending region 13 is the bending direction of the bending region 13. In the bent state, the bending support layer 20 is located on the inside of the bending region 13, which reduces the width of the lower frame of the display panel. In some embodiments of the present disclosure, the extension direction of the first hole V1 in the bending support layer 20 is configured to be consistent with the bending direction of the bending region 13, and at least two first holes V1 are arranged along the thickness direction of the bending support layer 20, so that it is easy for the part of the bending support layer 20 that bends along with the bending region 13 to compress in the bending direction. This ensures effective support for the bending region 13 and avoids screen breakage caused by excessive support.

In some embodiments of the present disclosure, as shown in FIG. 3, there are solid portions 23 between two adjacent first holes V1 along the thickness direction e of the bending support layer 20 in the first cross-section M1. When the bending support layer 20 is in an unfolded state, along the thickness direction e of the bending support layer 20, the width of the first hole V1 is D1, and the width of the solid portion 23 is D2, where $0.8 \leq D1/D2 \leq 1.2$. The solid portions 23 provide support between adjacent first holes V1, and the support strength of the bending support layer 20 is related to the thickness of the solid portions 23. By limiting the ratio between the width of the first hole V1 and the width of the solid portion 23, it ensures that when the bending support layer 20 bends with the bending region 13, the bending part is easy to compress in the bending direction, avoiding screen breakage due to excessive support. Meanwhile, it further avoids losing its support properties due to breakage of the bending support layer 20 itself during bending.

Figure 4:
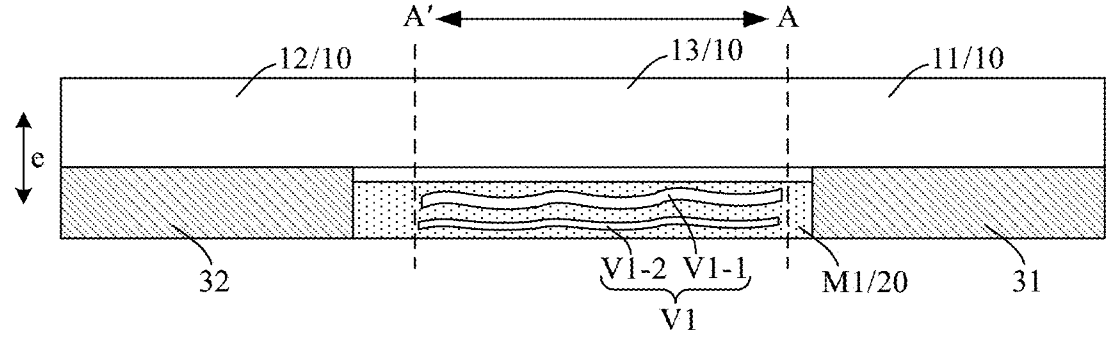
FIG. 4 is a cross-sectional view at the tangent A-A' position in FIG. 1 according to some embodiments of the present disclosure.

In some embodiments of the present disclosure, FIG. 4 is a cross-sectional view at the tangent A-A' position shown in FIG. 1. As shown in FIG. 4, at least two first holes V1 in the first cross-section M1 of the bending support layer 20 include a first sub-hole V1-1 and a second sub-hole V1-2. Along the thickness direction e of the bending support layer 20, the width of the first sub-hole V1-1 is greater than the width of the second sub-hole V1-2, where the first sub-hole V1-1 is located on a side of the second sub-hole V1-2 adjacent to the display module 10. Compared to the second sub-hole V1-2, the first sub-hole V1-1 is adjacent to the display module 10. Therefore, when the bending support layer 20 bends with the bending region 13, the bending deformation experienced by the position where the first sub-hole V1-1 is located will be greater. In some embodiments of the present disclosure, setting the width of the first sub-hole V1-1 along the thickness direction e of the bending support layer 20 to be larger facilitates greater deformation during bending at its location, preventing the bending support layer 20 from providing excessive support to the display module 10.

FIG. 3 and FIG. 4 only illustrate that two first sub-holes V1 are arranged along the thickness direction e of the bending support layer 20 in the first cross-section M1. In some embodiments of the present disclosure, the number of first sub-holes V1 arranged along the direction e can be defined based on parameters such as the thickness of the bending support layer 20 and the bending radius of the bending region 13.

As shown in FIG. 2, the display panel further includes a functional layer 50 located on a side of the first support layer 31 away from the first region 11. The functional layer 50 includes, but not limited to, films such as foam, and copper foil, etc. When in the bending state, the bending region 13 has a bending radius r, which is related to the thickness of the functional layer 50. The length of the bending part of the bending support layer 20 is further associated with the bending radius r. For example, the length of the bending part of the bending support layer 20 is not smaller than πr. When designing the extension length of the first hole V1 in the bending support layer 20, the size of the bending radius r can be referred.

As shown in FIG. 3, the extension shape of the first hole V1 in the first cross-section M1 is a curve, making its production process relatively simple. When the bending support layer 20 is in an unfolded state, the extension length of the first hole V1 along the direction from the first region 11 toward the second region 12 is L1 (not labeled in FIG. 3), and the straight-line length between the two ends of the first hole V1 in the direction from the first region 11 toward the second region 12 is L2, where L1>L2. The straight-line length refers to the length of the straight-line distance between the two ends, while the extension length refers to the length of the hole along its extension path. In the embodiments of the disclosure, the first hole V1 in the first cross-section M1 is configured to be a non-linear shape in its extension direction, and the first hole V1 is a non-linear hole, which can increase the extension length of the first hole V1, thereby enlarging the deformation space of the position where the first hole V1 is located. This facilitates the bending deformation of the bending support layer 20 and avoids excessive support of the display module 10 by the bending support layer 20.

Additionally, FIG. 3 and FIG. 4 illustrate that there is a certain distance between the display module 10 and the bending support layer 20 in the unfolded state, meaning that the display module 10 and the bending support layer 20 are not in direct contact. This can increase the deformation space of the bending support layer 20, avoiding excessive support to the display module 10 when the bending support layer 20 bends in close contact with the display module 10, which could result in excessive bending stress on the display module 10.

In some embodiments of the present disclosure, it is further possible to arrange for direct contact between the display module 10 and the bending support layer 20 in the unfolded state, and no additional drawing is provided for illustration here.

As shown in FIG. 1, when the display module 10 is in the unfolded state, the direction from the first region 11 toward the second region 12 is defined as the first direction a, and the second direction b intersects with the first direction a and is parallel to the plane where the display module 10 is located. It can be understood that when the display module 10 is in the unfolded state, the bending support layer 20 is further in the unfolded state, and the second direction b is further parallel to the plane where the bending support layer 20 is located.

Figure 5:
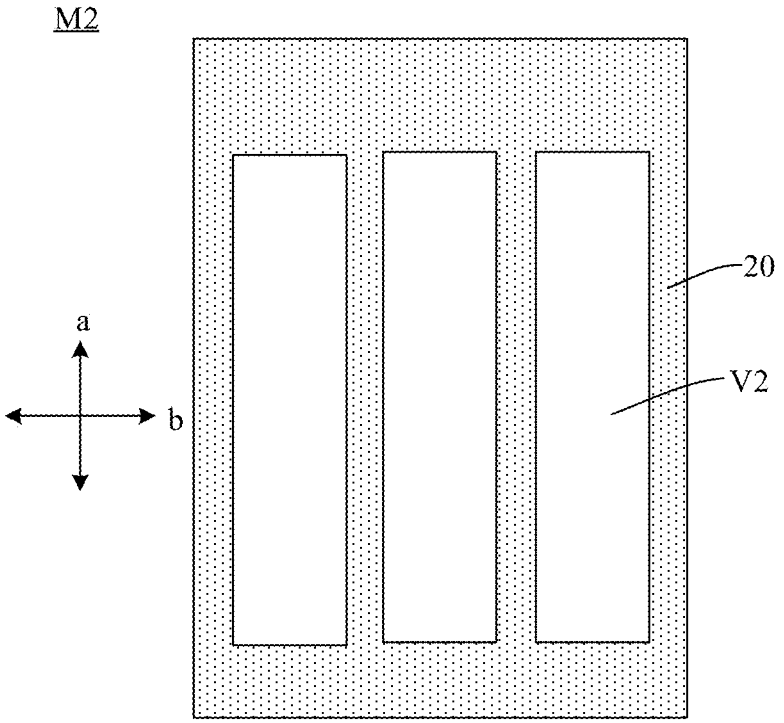
FIG. 5 is a partial cross-section view of a bending support layer in a display panel according to some embodiments of the present disclosure.

FIG. 5 is a partial cross-section view of a bending support layer in another display panel provided by the present disclosure. FIG. 5 illustrates the second cross-section M2 of the bending support layer 20, which is parallel to the plane where the bending support layer 20 is located. As shown in FIG. 5, when the bending support layer 20 is in the unfolded state, at least two first holes V1 in the bending support layer 20 are arranged along the second direction b. FIG. 5 further shows the first direction a intersecting with the second direction b, and the configuration of the first holes V1 in the second cross-section M2 can be understood in conjunction with FIG. 1. Arranging at least two first holes V1 along the second direction b ensures that the width of a single first hole V1 in the second direction b is not too large, thereby guaranteeing that the bending support layer 20 can still maintain sufficient support strength after multiple first holes V1 are provided, ensuring effective support for the bending region 13.

Figure 6:
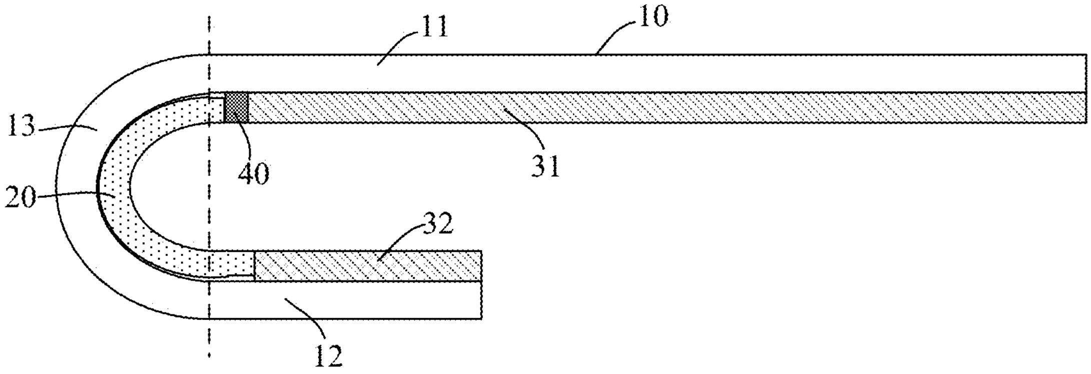
FIG. 6 is a schematic diagram of a display panel according to some embodiments of the present disclosure.

In some embodiments of the present disclosure, FIG. 6 is a schematic diagram of a display panel according to some embodiments of the present disclosure. As shown in FIG. 6, the display panel includes at least one buffering structure 40, and the end of the bending support layer 20 in the bending direction is connected to the buffering structure 40 when the bending support layer 20 bends. When the bending support layer 20 bends along with the bending region 13, the end of the bending support layer 20 presses against the buffering structure 40, and in the bending state, the buffering structure 40 further provides more ample buffering margin and space in the bending direction. The configuration of the buffering structure 40 can enhance the buffering performance of the bending support layer 20 in the bending stress direction, thereby releasing bending stress. That is, the buffering performance of the bending support layer 20 in the direction of bending rebound force is increased. The design adopted by the embodiments of the present disclosure can avoid the situation where the bending stress of the bending support layer 20 is not released and concentrates at the bending vertex, so that breakage of the bending region 13 occurs due to excessive support to the display module 10.

FIG. 6 illustrates an example where the bending support layer 20 extends to the end of the first region 11 and connects to the buffering structure 40. In some embodiments of the present disclosure, the bending support layer 20 extends to the end of the second region 12 and connects to the buffering structure 40.

Figure 7:
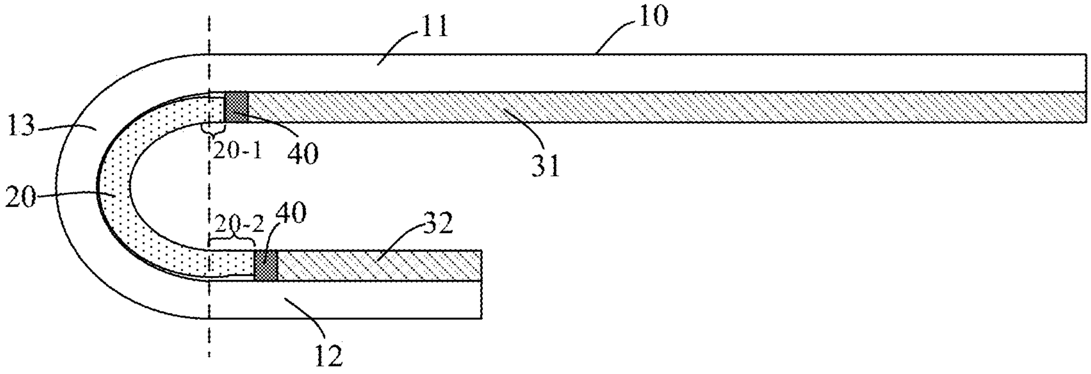
FIG. 7 is a schematic diagram of a display panel according to some embodiments of the present disclosure.

In some embodiments of the present disclosure, FIG. 7 is a schematic diagram of a display panel according to some embodiments of the present disclosure. As shown in FIG. 7, the display panel includes two buffer structures 40, which are respectively connected to the two ends of the bending support layer 20 located in the first region 11 and the second region 12. When the bending support layer 20 bends along the bending region 13, the two ends of the bending support layer 20 will respectively press the buffer structures 40, thereby effectively releasing the bending stress and avoiding the risk of breakage of the bending region 13 caused by excessive support to the display module 10 due to the inability to release the bending stress of the bending support layer 20.

In some embodiments of the present disclosure, the buffer structure 40 includes a compressible material. The compressible material has certain elasticity, bendability, and compressibility, which can release stress through deformation, thereby ensuring the buffer release of the bending stress of the bending support layer 20 in the bending state.

In some embodiments of the present disclosure, the compressible material includes foam.

As shown in FIG. 7, the display panel further includes a first support layer 31 and a second support layer 32, where the first support layer 31 is configured to support the first region 11, and the second support layer 32 is configured to support the second region 12. One buffer structure 40 is fixedly connected to the first support layer 31, and the other buffer structure 40 is fixedly connected to the second support layer 32. The overall mechanical stability between the support structures on the backside of the display module 10 is improved by the fixed connection method.

Figure 8:
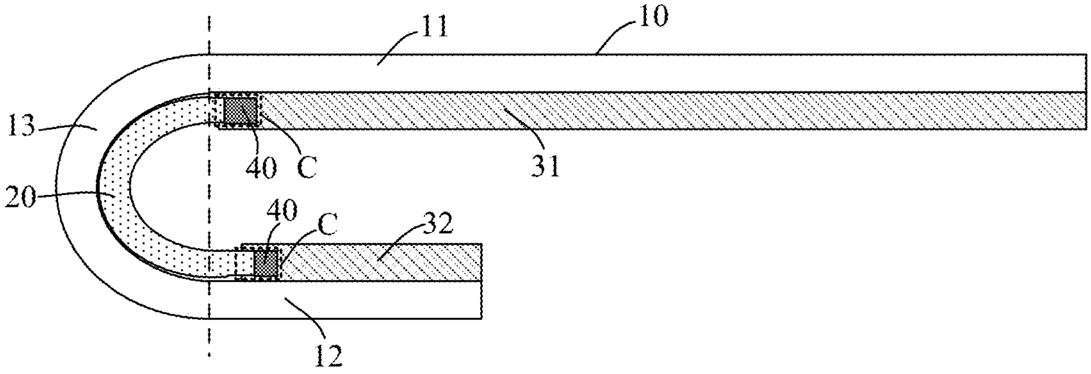
FIG. 8 is a schematic diagram of a display panel according to some embodiments of the present disclosure.

In some embodiments of the present disclosure, FIG. 8 is a schematic diagram of a display panel according to some embodiments of the present disclosure. As shown in FIG. 8, grooves C are respectively disposed at the ends of the first support layer 31 and the second support layer 32 adjacent to the bending support layer 20, and the buffer structures 40 are filled in the grooves C. The ends of the bending support layer 20 extend into the grooves C and connect to the buffer structures 40.

In some embodiments of the present disclosure, as shown in FIG. 3, in the direction from the first region 11 toward the second region 12, the bending support layer 20 includes a first end 20-1 and a second end 20-2, the first hole V1 is located between the first end 20-1 and the second end 20-2, and the position where the first hole V1 is located is within the bending region 13. As can be seen from the unfolded state illustrated in FIG. 3, in the direction from the first region 11 toward the second region 12, the first end 20-1 and the second end 20-2 each have a certain length, and part of the first end 20-1 and/or the second end 20-2 can be located in the bending region 13. In some embodiments of the present disclosure, the first hole V1 is entirely located in the bending region 13, which can increase the deformation capability of the bending support layer 20 at the position where larger bending deformation occurs during bending, making it easy for its bending part to compress in the bending direction.

Figure 9:
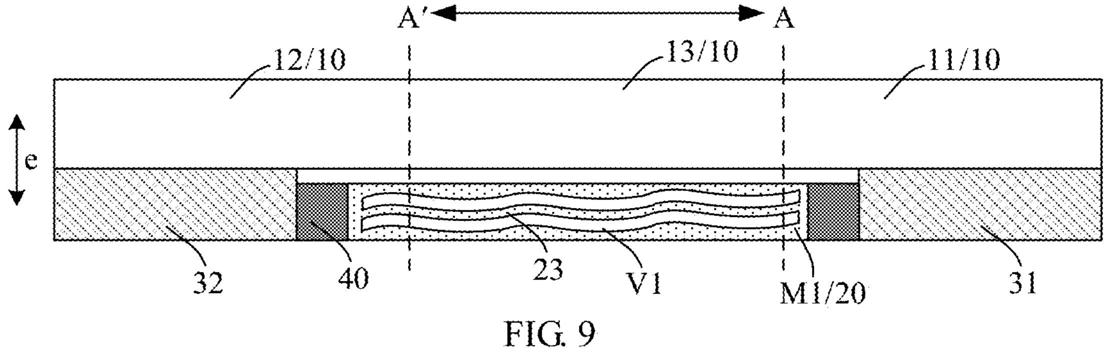
FIG. 9 is a cross-sectional view at the tangent A-A' position shown in FIG. 1 according to some embodiments of the present disclosure.

In some embodiments of the present disclosure, FIG. 9 is a cross-sectional view at the tangent A-A' position shown in FIG. 1. As shown in FIG. 9, in the first cross-section M1 of the bending support layer 20, the first hole V1 extends along the direction from the first region 11 toward the second region 12, and the first hole V1 extends from the bending region 13 to the first region 11 and the second region 12. This configuration enables the first hole V1 to have a longer extension length in its extension direction, thereby further increasing the bending deformation space of the bending support layer 20 and further avoiding excessive support to the display module 10 during bending of the bending support layer 20.

Figure 10:
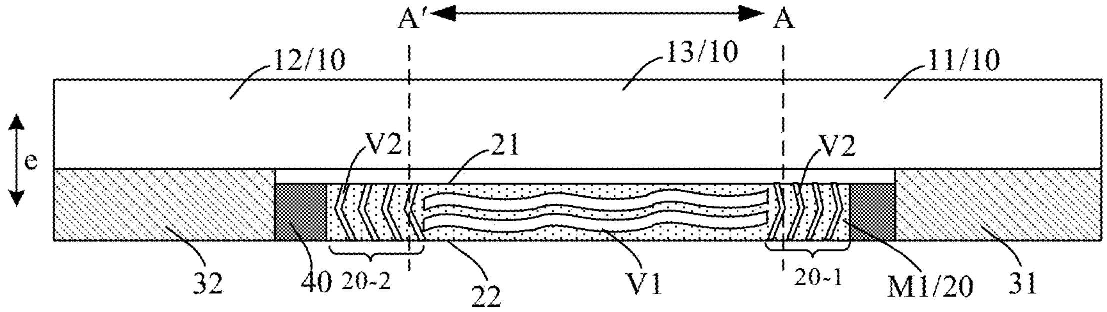
FIG. 10 is a cross-sectional view at the tangent A-A' position shown in FIG. 1 according to some embodiments of the present disclosure.

In some embodiments of the present disclosure, FIG. 10 is a cross-sectional view at the tangent A-A' position shown in FIG. 1. As shown in FIG. 10, the bending support layer 20 includes a first surface 21 and a second surface 22, where the first surface 21 faces the display module 10, and the second surface 22 is a surface of the bending support layer 20 away from the display module 10. The first end 20-1 and the second end 20-2 respectively include second holes V2, which extend from the first surface 21 to the second surface 22. The second holes V2 can be considered as through-holes perpendicular to the bending direction. The second holes V2 are located at least on one side of the first hole V1, meaning that the second holes V2 are arranged on both sides of the main bending part. The configuration of the second holes V2 allows the bending support layer 20 to be more easily compressed in the non-bending direction at the locations where the second holes V2 are located after bending, which helps to release the bending stress of the main bending part and reduces the risk of breakage of the bending region 13 caused by excessive support to the display module 10 due to the inability to release the bending stress of the bending support layer 20.

In some embodiments of the present disclosure, the second hole V2 is arranged in one of the first end 20-1 and the second end 20-2, and no further diagram is provided here for illustration.

FIG. 10 illustrates the unfolded state of the display panel. As shown in FIG. 10, when the bending support layer 20 is in an unfolded state, the extension length L3 of the second hole V2 from the first surface 21 to the second surface 22 is greater than the distance L4 between the first surface 21 and the second surface 22, i.e., L3>L4. The distance L4 further represents the thickness of the bending support layer 20 in the unfolded state. In some embodiments of the present disclosure, the second hole V2 is a non-straight hole, which can increase the extension length of the second hole V2, thereby enhancing the compressible amount of the bending support layer 20 in the non-bending direction.

In some embodiments of the present disclosure, as shown in FIG. 10, in the direction where the second hole V2 extends from the first surface 21 to the second surface 22, the distance between the second hole V2 and the first hole V1 first increases and then decreases. This distance is defined by the spacing between the two holes in the first cross-section M1 along a direction parallel to the plane where the bending support layer 20 is located. FIG. 10 illustrates the shape of the second hole V2 in the first cross-section M1 as a V-shape, with the opening of the V-shape facing towards the first hole V1. The shape of the second hole V2 in the first cross-section M1 can further be an arc-shape. By designing the distance between the second hole V2 and the first hole V1 to vary with a certain rule, it becomes easy for the bending support layer 20 to compress in the non-bending direction at the position of the second hole V2 after bending, which further release the bending stress in the main bending part.

Figure 11:
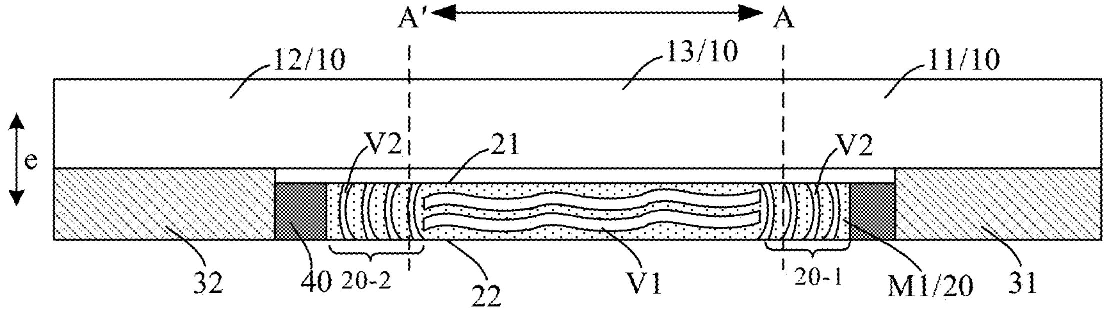
FIG. 11 is a cross-sectional view at the tangent A-A' position shown in FIG. 1 according to some embodiments of the present disclosure.

In some embodiments of the present disclosure, FIG. 11 is a cross-sectional view at the tangent A-A' position shown in FIG. 1. As shown in FIG. 11, the shape of the second hole V2 in the first cross-section M1 can further be an arc-shape, and the arc of the second hole V2 protrudes away from the first hole V1.

Figure 12:
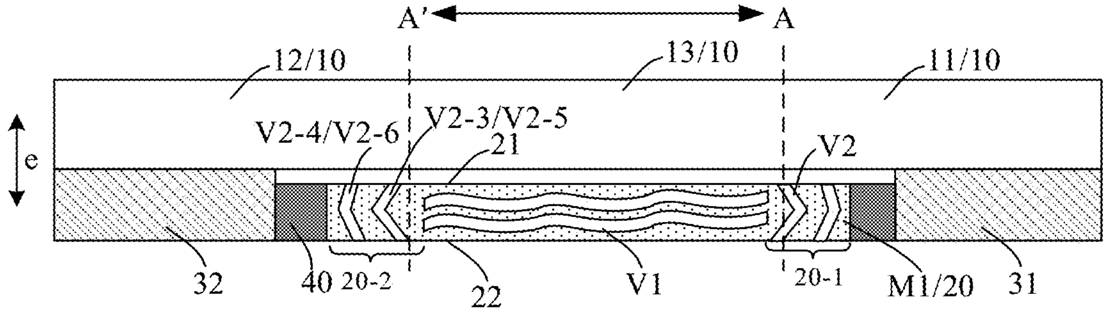
FIG. 12 is a cross-sectional view at the tangent A-A' position shown in FIG. 1 according to some embodiments of the present disclosure.

In some embodiments of the present disclosure, FIG. 12 shows a cross-sectional view at the tangent A-A' position shown in FIG. 1. As illustrated in FIG. 12, the bending support layer 20 includes at least two second holes V2, which consist of a third sub-hole V2-3 and a fourth sub-hole V2-4. Both the third sub-hole V2-3 and the fourth sub-hole V2-4 are located on the same side of the first hole V1, with the distance from the third sub-hole V2-3 to the first hole V1 being smaller than that from the fourth sub-hole V2-4 to the first hole V1. In the first cross-section M1, the shape of the second hole V2 is a V-shape, with the angle of the third sub-hole V2-3 facing the first hole V1 being the first angle, and the angle of the fourth sub-hole V2-4 facing the first hole V1 being the second angle. Here, the first angle is smaller than the second angle. In other words, in the first cross-section M1, the larger the distance between the second hole V2 and the first hole V1, the larger the angle of the V-shape. This configuration allows the location of the third sub-hole V2-3, which is adjacent to the first hole V1, to have a greater compression in the non-bending direction. When the bending support layer 20 bends, the bending stress at the main bending position where the first hole V1 is located will be transmitted and dispersed to both sides of the first hole V1. The position adjacent to the first hole V1 suffers relatively more bending stress, and the position away from the first hole V1 suffers relatively less bending stress. Consequently, during the bending of the bending support layer 20, the position adjacent to the first hole V1 has relatively greater compression in the non-bending direction, while the position away from the first hole V1 has relatively less compression. By designing the V-shaped angle of the second hole V2 based on the magnitude of bending stress on one side of the first hole V1 in the embodiments of the present disclosure, the bending support layer 20 can be appropriately compressed at local positions during bending, thereby facilitating the bending of bending support layer 2, reducing the risk of breakage of the bending region 13 caused by excessive support to the display module 10 due to the inability to release the bending stress of the bending support layer 20.

In some embodiments of the present disclosure, multiple V-shaped second holes V2 are arranged on one side of the first hole V1 in the first cross-section M1, and the V-shaped angles of these second holes V2 gradually increase in the direction away from the first hole V1 in the first cross-section M1.

In some embodiments of the present disclosure, the bending support layer 20 includes at least two second holes V2, which consist of a fifth sub-hole and a sixth sub-hole. In the unfolded state, both the fifth sub-hole and the sixth sub-hole are located on the same side of the first hole V1, with the distance from the fifth sub-hole to the first hole V1 being smaller than that from the sixth sub-hole to the first hole V1. The extension length of the fifth sub-hole in its extension direction is greater than that of the sixth sub-hole in its extension direction. Here, the extension length of the second hole V2 refers to the length of the second hole V2 along its extension path. For instance, if the second hole V2 is V-shaped in the first cross-section M1, its extension length is a sum of the length of the two line segments forming the V-shape. If the second hole V2 is arc-shaped in the first cross-section M1, its extension length is the arc length of the arc. The longer the extension length of the second hole V2 in its extension direction, the greater the compressible amount of the position where it is located in the non-bending direction. The design adopted by the embodiments of the present disclosure enables the compressible amount of the position where the fifth sub-hole is located in the non-bending direction to be greater than that of the position where the sixth sub-hole is located, allowing for appropriate compression at local positions during the bending of the bending support layer 20. This facilitates the bending of the bending support layer 20 and reduces the risk of breakage of the bending region 13 caused by excessive support to the display module 10 due to the inability to release the bending stress of the bending support layer 20.

When the second hole V2 is V-shaped in the first cross-section M1, the third sub-hole V2-3 in the embodiment of FIG. 12 can be considered as the fifth sub-hole V2-5, and the fourth sub-hole V2-4 can be considered as the sixth sub-hole V2-6, meaning that the extension length of the third sub-hole V2-3 is greater than that of the fourth sub-hole V2-4.

In some embodiments of the present disclosure, multiple second holes V2 are arranged on one side of the first hole V1 in the first cross-section M1, and the extension length of these second holes V2 gradually decreases in the direction away from the first hole V1 in the first cross-section M1.

Figure 13:
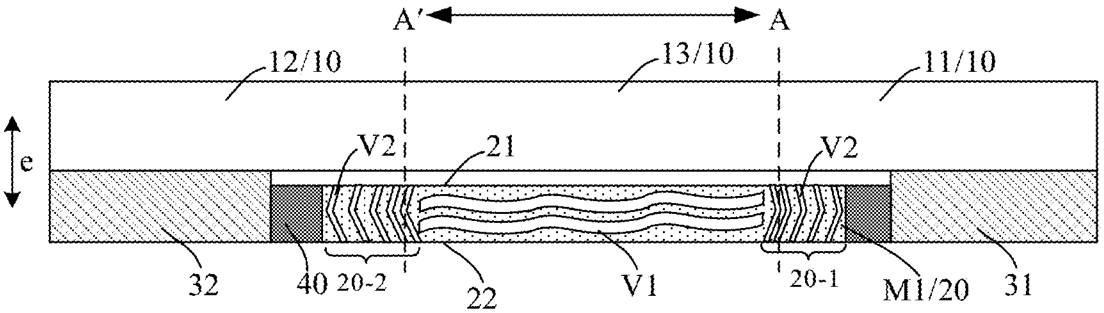
FIG. 13 is a cross-sectional view at the tangent A-A' position shown in FIG. 1 according to some embodiments of the present disclosure.

In some embodiments of the present disclosure, FIG. 13 shows a cross-sectional view at the tangent A-A' position shown in FIG. 1. As illustrated in FIG. 13, the bending support layer 20 includes multiple second holes V2. At least on one side of the first hole V1, the arrangement density of the second holes V2 gradually decreases in the direction away from the first hole V1. During bending, the position of the bending support layer 20 adjacent to the first hole V1 has relatively greater compression in the non-bending direction, while the position away from the first hole V1 has relatively smaller compression in the non-bending direction. In some embodiments of the present disclosure, designing the arrangement density of the second holes V2 based on the bending stress suffered by one side of the first hole V1, enables appropriate compression at local positions during the bending of the bending support layer 20. This facilitates the bending of the bending support layer 20 and reduces the risk of breakage of the bending region 13 caused by excessive support to the display module 10 due to the inability to release the bending stress of the bending support layer 20.

Figure 14:
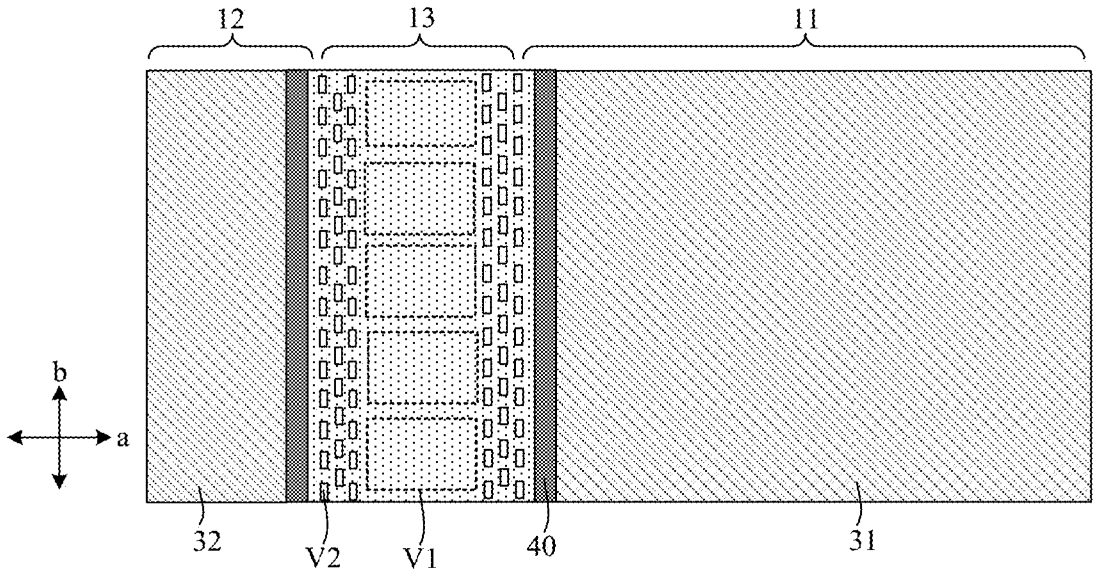
FIG. 14 is a schematic diagram of a display panel according to some embodiments of the present disclosure.

In some embodiments of the present disclosure, FIG. 14 illustrates another schematic diagram of a display panel according to some embodiments of the present disclosure, showing the unfolded state of the display panel and a top view of the display panel from the side of the bending support layer 20 when in the unfolded state. FIG. 14 does not show the display module 10 but only indicates the positions of the first region 11, the second region 12 and the bending region 13. FIG. 14 illustrates intersecting first direction a and second direction b, where the first direction a is the direction from the first region 11 toward the second region 12 when the display module 10 is unfolded, and the second direction b is parallel to the plane where the bending support layer 20 is located. It is understood that the first hole V1 is located inside the bending support layer 20 and the surface of the bending support layer 20 does not expose the first hole V1, so FIG. 14 only indicates the position of the first hole V1 with a dashed line. As can be seen from FIG. 14, the first hole V1 extends along the direction from the first region 11 toward the second region 12, and multiple first holes V1 are arranged in the second direction b. When the bending support layer 20 is in the unfolded state, multiple second holes V2 are arranged along the second direction b on both sides of the first hole V1. Multiple second holes V2 in the second direction b are arranged in some embodiments of the present disclosure, enabling a certain degree of compressible amount at different positions of the bending support layer 20 in the second direction b, which facilitates the distribution of bending stress and ensures the overall structural strength and reliable support performance of the bending support layer 20.

FIG. 14 schematically shows that the shape of the opening of the first hole V1 is rectangular. In some embodiments of the present disclosure, the shape of the opening of the first hole V1 in the top view is not limited and can further be circular, triangular, or other shapes.

In some embodiments of the present disclosure, as shown in FIG. 14, when the bending support layer 20 is in an unfolded state, at least on one side of the first hole V1, multiple second holes V2 are staggered along the first direction a. Such configuration enables better compression of the bending support layer 20 at the positions where the multiple second holes V2 are located during bending, avoiding the problem of stress concentration caused by excessive differences in compression between different positions of the bending support layer 20. The design adopted by embodiments of the present disclosure facilitates the bending of the bending support layer 20 and reduces the risk of breakage of the bending region 13 caused by excessive support to the display module 10 due to the inability to release the bending stress of the bending support layer 20.

In some embodiments of the present disclosure, as can be seen in FIG. 7, when the bending region 13 is in a bent state, the first support layer 31 and the second support layer 32 are not aligned on the side adjacent to the bending region 13. Combining FIG. 7 and FIG. 10, the first end 20-1 is at least partially located in the first region 11, and the second end 20-2 is at least partially located in the second region 12, with the length of the first end 20-1 being shorter than the length of the second end 20-2. Setting the length of the two ends, allows the distance from the edge of the first support layer 31 to the bending region 13 to be smaller than the distance from the edge of the second support layer 32 to the bending region 13, which narrows the lower frame of the display panel. Moreover, in practical applications, the second region 12 is located on the backside of the display surface, the flexible circuit board is bonded with the second region 12. The second support layer 32 is configured to support the second region 12, and the distance between the second support layer 32 and the bending region 13 does not affect the width of the lower frame of the display panel. Setting a longer length for the second end 20-2 can better release bending stress and reduce the risk of breakage caused by excessive support to the display module 10 by the bending support layer 20.

In some embodiments of the present disclosure, the length of the first end 20-1 and the second end 20-2 can be the same.

Figure 15:
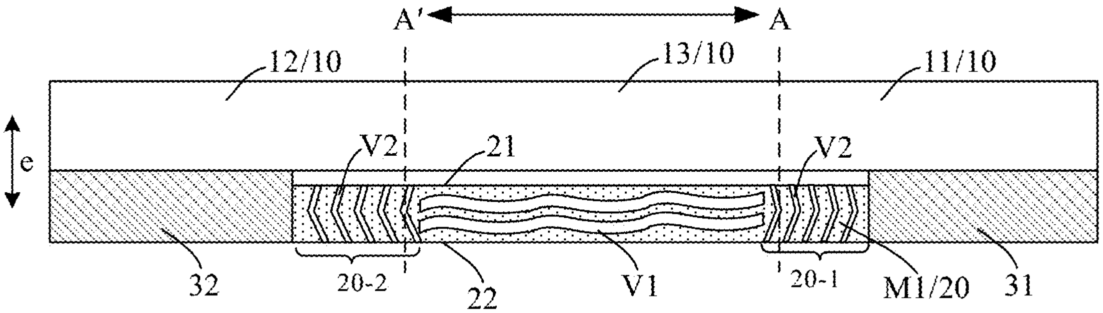
FIG. 15 is a cross-sectional view at the tangent A-A' position shown in FIG. 1 according to some embodiments of the present disclosure.

In the embodiments of FIG. 10 to FIG. 13 above, the bending support layer 20 includes both the first hole V1 and the second hole V2, and the display panel includes two buffering structures 40 for illustration. In some embodiments of the present disclosure, FIG. 15 shows a cross-sectional diagram at the tangent line A-A' position shown in FIG. 1. As shown in FIG. 15, the bending support layer 20 includes the first hole V1 and the second hole V2, the display panel does not include two buffering structures. The cooperation of the first hole V1 and the second hole V2 can further release bending stress, so that the bending support layer 20 is easy to bend, reducing the risk of screen breakage due to excessive support from the bending support layer 20.

Figure 16:
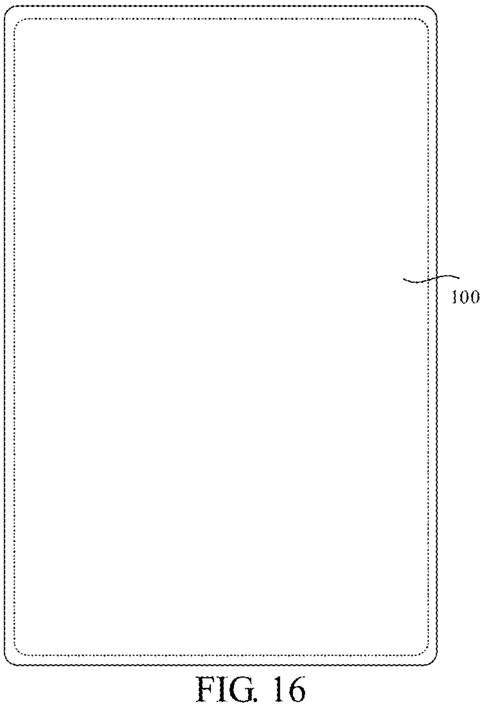
FIG. 16 is a schematic diagram of a display apparatus according to some embodiments of the present disclosure.

Based on the same inventive concept, the present disclosure further provides a display apparatus. FIG. 16 is a schematic diagram of a display apparatus according to some embodiments of the present disclosure. As shown in FIG. 16, the display apparatus includes a display panel 100 provided by any embodiment of the present disclosure. The structure of the display panel 100 has been described in the above embodiments and will not be repeated here. The display apparatus provided by the embodiments of the present disclosure can be electronic products with display functions, such as mobile phones, tablets, laptops, TVs, etc.

The above are merely exemplary embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A display panel, comprising:

a display module, comprising a first region, a bending region and a second region, wherein the bending region is connected between the first region and the second region, the first region comprises a display surface;

a bending support layer located in the bending region, wherein at least part of the bending support layer extends to the first region and the second region, a partial region of the bending support layer comprises at least two first holes, the bending support layer has a first cross-section perpendicular to a plane where the first region is located, wherein in the first cross-section, the first hole extends along a direction from the first region towards the second region, and at least two first holes are arranged along a thickness direction of the bending support layer;

two compressible buffer structures respectively connected to two ends of the bending support layer located in the first region and the second region; and a first support layer and a second support layer, wherein the first support layer is located at a side of the first region away from the display surface, and when the bending region is in a bent state, the second support layer is located at a side of the second region adjacent to the first support layer; and wherein one of the at least one buffer structure is fixedly connected to the first support layer, and one of the at least one buffer structure is fixedly connected to the second support layer;

wherein in the direction from the first region towards the second region, the bending support layer comprises a first end and a second end, the first hole is located between the first end and the second end, and a position where the first hole is located is within the bending region;

wherein the bending support layer comprises a first surface and a second surface, the first surface faces the display module, and the second surface is a surface of the bending support layer away from the display module; and at least one of the first end or the second end comprises a second hole, which extends from the first surface to the second surface.

2. The display panel according to claim 1, wherein a solid portion is provided between two adjacent first holes along the thickness direction of the bending support layer; and when the bending support layer is in an unfolded state, along the thickness direction of the bending support layer, a width of the first hole is D1, and a width of the solid portion is D2, where $0.8 \leq D1/D2 \leq 1.2$.

3. The display panel according to claim 1, wherein in the first cross-section, at least two first holes comprise a first sub-hole and a second sub-hole; and along the thickness direction of the bending support layer, a width of the first sub-hole is greater than a width of the second sub-hole; and the first sub-hole is located at a side of the second sub-hole adjacent to the display module.

4. The display panel according to claim 1, wherein when the bending support layer is in an unfolded state, an extension length of the first hole in the direction from the first region towards the second region is $L_1$, and a straight-line length between two ends of the first hole in the direction from the first region towards the second region is $L_2$, where $L_1>L_2$.

5. The display panel according to claim 1, wherein the display panel comprises at least one buffer structure, and an end of the bending support layer is connected to the buffer structure.

6. The display panel according to claim 5, wherein the buffer structure comprises a compressible material.

7. The display panel according to claim 6, wherein the compressible material comprises foam.

8. The display panel according to claim 1, wherein when the bending support layer is in an unfolded state, an extension length of the second hole from the first surface to the second surface is $L_3$, a distance between the first surface and the second surface is $L_4$, where $L_3>L_4$.

9. The display panel according to claim 1, wherein in a direction from the first surface to the second surface where the second hole extends, a distance between the second hole and the first hole first increases and then decreases.

10. The display panel according to claim 9, wherein in the first cross-section, a shape of the second hole is V-shape or arc-shape.

11. The display panel according to claim 10, wherein the bending support layer comprises at least two second holes, comprising a third sub-hole and a fourth sub-hole;

the third sub-hole and the fourth sub-hole are located at a same side of the first hole, and a distance between the third sub-hole and the first hole is smaller than a distance between the fourth sub-hole and the first hole; and in the first cross-section, the shape of the second hole is V-shape, an angle of the third sub-hole towards the first hole is a first angle, an angle of the fourth sub-hole towards the first hole is a second angle, and the first angle is smaller than the second angle.

12. The display panel according to claim 1, wherein the bending support layer comprises at least two second holes, comprising a fifth sub-hole and a sixth sub-hole; and the fifth sub-hole and the sixth sub-hole are located at a same side of the first hole, and a distance between the fifth sub-hole and the first hole is smaller than a distance between the sixth sub-hole and the first hole; and an extension length of the fifth sub-hole in its extension direction is greater than an extension length of the sixth sub-hole in its extension direction.

13. The display panel according to claim 1, wherein the bending support layer comprises multiple second holes, at least at one side of the first hole, an arrangement density of the second holes gradually decreases along a direction away from the first hole.

14. The display panel according to claim 1, wherein when the display module is in an unfolded state, the direction from the first region towards the second region is a first direction; and when the bending support layer is in an unfolded state, multiple second holes are arranged on at least one side of the first hole along a second direction, and the second direction intersects with the first direction and is parallel to the plane where the bending support layer is located.

15. The display panel according to claim 14, wherein when the bending support layer is in an unfolded state, on at least one side of the first hole, multiple second holes are arranged in a staggered manner along the first direction.

16. The display panel according to claim 1, wherein the first end is located in the first region, the second end is located in the second region, and a length of the first end is smaller than a length of the second end.

* * * * *